United States Patent [19]

Nakamura et al.

[11] Patent Number: 4,572,867

[45] Date of Patent: Feb. 25, 1986

[54] MAGNETIC RECORDING MEDIUM

[75] Inventors: Issei Nakamura; Kenji Itozawa, both of Hachioji, Japan

[73] Assignee: Konishiroku Photo Industry Co., Ltd., Tokyo, Japan

[21] Appl. No.: 545,663

[22] Filed: Oct. 26, 1983

[30] Foreign Application Priority Data

Oct. 29, 1982 [JP] Japan .................................. 57-190276

[51] Int. Cl.$^4$ ................................................ G11B 5/70
[52] U.S. Cl. .................................. 428/328; 252/62.54; 360/134; 360/135; 360/136; 427/128; 427/131
[58] Field of Search ............... 428/694, 900, 328, 325, 428/425.9, 412, 480, 522, 474.4; 427/132, 128, 44; 252/62.54; 360/134–136

[56] References Cited

U.S. PATENT DOCUMENTS

| | | | |
|---|---|---|---|
| 4,246,316 | 1/1981 | Aonuma et al. | 428/329 |
| 4,262,037 | 4/1981 | Asada et al. | 427/130 |
| 4,267,207 | 5/1981 | Sasazawa et al. | 427/132 |
| 4,273,807 | 6/1981 | Berry | 427/132 |
| 4,396,668 | 8/1983 | Saito et al. | 428/220 |
| 4,520,069 | 5/1985 | Kitamoto | 428/694 |

*Primary Examiner*—Ellis P. Robinson
*Attorney, Agent, or Firm*—Frishauf, Holtz, Goodman & Woodward

[57] ABSTRACT

A magnetic recording medium comprising a support and a magnetic layer on said support. The magnetic layer is a unitary magnetic layer comprising ferromagnetic metallic powder. The average grain size of said ferromagnetic powder is not more than 0.5μ, the ratio of the major axis to the minor axis (acicular ratio) of said powders is from 1.3 to 4.5, and the coercive force of said powder is from 1350 Oe to 1600 Oe.

20 Claims, No Drawings

MAGNETIC RECORDING MEDIUM

BACKGROUND OF THE INVENTION

The present invention relates to the improvement of magnetic recording media and more particularly to the magnetic recording media for the high frequency wave recording suitable for the requirement of magnetic recording in ultrahigh density which is higher in density than the recording in ordinary video signals and audio signals.

For the purpose of raising the recording density and the sensitivity of the magnetic recording medium, the support base has been coated with a magnetic layer comprising a binder containing dispersed ferromagnetic powder whose squareness ratio (i.e., residual magnetic flux density Br/saturation magnetic flux density Bm) is great and both Br itself and coercive force Hc are great. For the requirement of both squareness ratio and Hc, in this case, iron oxide type magnetic powder such as cobalt adsorbed $\gamma$-Fe$_2$O$_3$ and metallic magnetic powder such as Fe and Fe—Co—Ni are utilized as ferromagnetic powder to be contained in a magnetic layer. Especially, it is deemed that metallic magnetic powder are suitable for the ferromagnetic powder whose squareness ratio and Hc are great. Hc of these metallic magnetic powder is usually 1000 Oe or so (900–1200 Oe) which has not been suitable for the high frequency wave recording of the density required in ordinary video signals and audio signals.

However, when the recording which is higher in density than the aforesaid high frequency wave recording is required e.g., for 8 mm video, a magnetic recording medium whose Hc does not exceed the aforesaid 1000 Oe or so by much is easily disturbed and making it difficult to maintain the recording because repeated signals are constantly given to the recording medium in an ON/OFF mode. Further, the aforesaid ferromagnetic powder are acicular crystals and the length of a major axis thereof is 0.3–0.9$\mu$, the length of a minor axis is 0.05–0.1$\mu$ and an acicular ratio Ra (i.e., major axis/minor axis ratio) is thereby from 5 to 10 which is very large. Therefore, if the ferromagnetic powder is finely granulated to obtain a high Hc, it becomes brittle and the Hc varies in the magnetic layer, which causes the magnetic transferring for stacking. Meanwhile, due to the requirement of raising the degree of orientation in the ferromagnetic powder having a high acicular ratio, the more the powder is finely granulated, the greater is the orientating magnetic field which is needed and thereby the surface of the magnetic layer becomes rough, the saturation magnetic flux density Br becomes small and thereby the recording medium is easily saturated, thus the ferromagnetic powder having a high acicular ratio is not suitable for a recording having high sensitivity, high output and high density.

SUMMARY OF THE INVENTION

The present invention has been devised with the purpose of eliminating such disadvantages in the conventional magnetic recording medium and of providing a magnetic recording medium for high frequency wave capable of being utilized for ultrahigh density recording, e.g., an 8 mm video.

The present invention is a magnetic recording medium having a magnetic layer containing therein ferromagnetic powder on a support base thereof, wherein said ferromagnetic powder is metallic ferromagnetic powder, the average grain size of said ferromagnetic powder is not more than 0.5$\mu$, the acicular ratio Ra is within the range from 1.3 to 4.5 and the coersive force Hc is within the range from 1350 Oe to 1600 Oe.

As the ferromagnetic powder to be contained in the magnetic layer of the magnetic recording medium in the present invention, metallic ferromagnetic powder such as Fe, Co, Ni, Cr, Fe—Co—Ni, Fe—Ni—Zn, Fe—Mn—Zn, Fe—Al, MnBi, Fe—Al—P, Fe—Co—Ni—Cr, Fe—Co—Ni—P, Ni—Co, Fe—Ni, Fe—Ni—Mn, Co—Ni—P, Co—P, Fe—Ni—Cr—P, Fe—Ni—Co—Zn and the like, for example, are used independently or in combination and especially an iron ferromagnetic powder (one containing Fe of more than 60% by weight, preferably 80% by weight) is preferable. Further, as an additive in a small amount to be added to the aforesaid metallic ferromagnetic powder, chemical element such as Mg, Mn, Si, P, Cu or the like, for example, and compounds thereof may be used. For the high density recording, the grain size of aforesaid ferromagnetic powder is not more than 0.5$\mu$ (e.g., 0.05–0.5$\mu$) and preferably it is not more than 0.3$\mu$ (e.g., 0.1–0.3$\mu$).

As a material for the support base, polyesters such as polyethylene terephthalate, polyethylene-2, 6-naphthalate or the like, polyolefins such as polypropylene or the like, cellulose derivatives such as cellulose triacetate and cellulosediacetate or the like, plastics in various kinds such as polycarbonate polyvinylchloride, polyimide and nylon, non-magnetic metal such as Al and Zn and ceramics are used.

The thickness of such support base is about 3–100$\mu$, preferably 5–50$\mu$ for the film and sheet type and 30$\mu$–10 mm or so for the disk and card type and for the drum type, it will be a cylindrical shape the type of which may be decided according to the recorder to be used.

For the purpose of antistatic and transferring-prevention for the aforesaid support base, the surface thereof opposite to the one having the magnetic layer provided thereon may be given a so-called backcoating.

Backcoating is described in the specifications of U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 etc.

The form of the support may be a tape, sheet, card, disk and drum or the like and the material of the support may be selected according to the form thereof.

As a binder, conventional known thermoplastic resin, thermosetting resin, radiation curable resin and electron-irradiation-setting resin or mixtures thereof may be used.

Thermoplastic resins having a softening temperature of 150° C. or less, average molecular weight of 10,000–200,000 and degree of polymerization of about 200–2,000 such as, for example, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, urethane elastomer, vinyl polyfluoride, vinylidene chloride-acrylonitrile copolymer, acrylonitrile-butadiene copolymer, polyamide resin, polyvinylbutyral, cellulose derivatives (cellulose acetate butyrate, cellulose diacetate, cellulose triacetate, cellulose propionate, nitrocellulose etc.), styrene-butadiene copolymer, polyester resin, chlorovinyl ether-acrylic acid ester copolymer, amino resin and thermoplastic resins of synthetic rubber of every kind and mixtures thereof, are used.

These resins are described in Japanese Patent Examined Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, 27886/1973, U.S. Pat. Nos. 3,144,352, 3,419,420, 3,499,789 and 3,713,887.

For thermosetting resins or radiation curable resins, the molecular weight thereof in the state of liquid to be coated is not more than 200,000 and it becomes infinite after coating and drying owing to the reaction of condensation and addition. Among these resins, those that do not soften or melt during pyrolysis thereof are preferable. Such resins include, for example, phenolic resin, polyurethane-setting resin, urea resin, melamine resin, alcid resin, silicone resin, acrylic reaction resin, mixture of high molecular weight polyester resin and isocyanateprepolymer, mixture of methacrylate copolymer and diisocyanate prepolymer, mixture of polyester-polyol and polyisocyanate, urea formaldehyde resin, mixture of low molecular weight glycol/high molecular weight diol/triphenylmethane triisocyanate and polyamine resin and mixtures thereof.

These resins are described in Japanese Patent Examined Publication Nos. 8103/1964, 9779/1965, 7192/1966, 8016/1966, 14275/1966, 18179/1967, 12081/1968, 28023/1969, 14501/1970, 24902/1970, 13103/1971, 22067/1972, 22072/1972, 22073/1972, 28045/1972, 28048/1972, 28922/1972, U.S. Pat. Nos. 3,144,353, 3,320,090, 3,437,510, 3,597,273, 3,781,210 and 3,781,211.

Electron-beam-irradiation-setting resins include an unsaturated prepolymer such as maleic anhydride type, urethaneacryl type, polyesteracryl type, polyetheracryl type, polyurethaneacryl type and polyamideacryl type etc., and multifunctional monomers such as ether acryl type, urethaneacryl type, phosphoric esteracryl type, aryl type, hydrocarbon type and the like.

These binders are used independently or in combination, and besides, additives may be added if necessary.

The mixture proportion of ferromagnetic powders relating to the invention and the binders is within the range of 5 to 400 parts, and preferably 10 to 100 parts by weight of the binders to 100 parts by weight of the ferromagnetic powder. If the binders are used in excess thereof to produce a magnetic recording medium, the recording density of the recording medium is lowered. If they are used in too small an amount, to the contrary, the strength of a magnetic layer is weakened and thereby unfavorable phenomena such as the deterioration of durability, shedding and the like will occur.

To improve the ferromagnetic recording media relating to the invention to be more durable, various hardening agents such as a polyisocyanate, may be contained in the magnetic layer.

Such polyisocyanates include the addition product of diisocyanate and tervalent polyol, or a decarboxylated compound of diisocyanate pentamer/3 mole of diisocyanate/water.

The examples thereof include the addition product of 3 mole of tolylene diisocyanate/1 mole of trimethylol propane, the addition product of 3 mole of methaxylylene diisocyanate/1 mole of trimethylol propane, tolylenediisocyanate pentamer, the pentamer comprising 3 mole of tolylene diisocyanate/2 mole of hexamethylene diisocyanate, the decarboxylated product obtainable by making 3 mole of hexamethylene diisocyanate react with 1 mole of water, and the like. These may readily be prepared in an industrial scale.

Magnetic layers contains the ferromagnetic powders relating to the invention, the described binders, and hardening agents, may also contain such additives as a dispersant, coupling agent, lubricant, head cleaning agent, antistatic agent and the like.

As for the dispersant to be used, there may be used a fatty acid having 8 to 18 carbon atoms such as caprylic acid, capric acid, lauric acid, myristic acid, palmitic acid, stearic acid, oleic acid, elaidic acid, linolic acid, linolenic acid and the like, which are represented by R—OOH, wherein R represents a saturated or unsaturated hydrocarbon radical having 7 to 17 carbon atoms; a metallic soap comprising an alkali metal of the described fatty acids such as Li, Na, K, etc., or an alkaline earth metal such as Mg, Ca, Ba, etc. Besides, a higher alcohol having not less than 12 carbon atoms, a sulfate and the like can also be used. These dispersing agents may be used independently or in combination. These dispersing agents are to be added within the range of 1 to 20 parts by weight to 100 parts by weight of the described powder.

The lubricants which can be used include silicon oil, graphite, molybdenum disulfide, tungsten disulfide, a fatty acid ester comprising a monobasic fatty acid having 12 to 16 carbon atoms and a monovalent alcohol having 3 to 12 carbon atoms and a fatty acid ester comprising a monobasic fatty acid having 17 carbon atoms or more and a monovalent alcohol whose number of carbon atoms is 21 to 23 when the number of carbon atoms of aforesaid fatty acid is added thereto. These lubricants may be added within the range of 0.2 to 20 parts by weight thereof to 100 parts by weight of the described powder.

The abrasives which can be used include fused alumina, silicon carbide, chromium oxide, corundum, artificial corundum, diamond, artificial diamond, garnet, emery are used as a material to be generally used. They are used in the average particle size of 0.05 to 5μ and more preferably, 0.1 to 2μ. They are added within the range of 1 to 20 parts by weight to 100 parts by weight of the powder.

The antistatic agents which can be used include electroconductive powders such as graphite, carbon black, tin oxide-antimony oxide type compounds, tin oxide-titanium oxide-antimony oxide type compounds, carbon black graft polymer and the like; natural surface active agents such as saponin; nonionic surface active agents such as alkylene oxide type, glycerol type, glycidol type or the like; cationic surface active agents such as higher alkylamine type, quaternary ammonium salt type, heterocyclic type of pyridine or the like, phosphonium or sulfonium type; anionic surface active agents containing such an acid radical as carbonic acid, sulfonic acid, phosphoric acid, sulfate, phosphate or the like; surface active agents such as amino acid type, aminosulfonic acid type, sulfate or phosphate of amino alcohol; and the like.

Among the aforesaid antistatic agents, the surface active agents may be added independently or in combination. These surface active agents are to be used as antistatic agents, and there are also some instances where they are used with the other purposes of, for example, dispersing, improving the magnetic characteristics and lubricity, and serving as a coating aid.

For the improvement in the dispersibility of magnetic powders, either a method to prepare the processed magnetic powder by processing the aforesaid ferromagnetic powder with coupling agents in advance or a method wherein the aforesaid ferromagnetic powder and coupling agents are added to magnetic coatings and they are kneaded with binders, is useful.

Titanate group coupling agents and silane group coupling agents are available as typical coupling agents. The preferred coupling agent for the ferromagnetic powder of the present invention are the titanate group coupling agents which include isopropyltri-isostearoyltitanate, isopropyldi-stearoylmethacryltitanate, isopropyldi methacrylisostearoyltitanate, isopropyltricumylphenyltitanate, isopropyltri(dioctyl pyrophosphate)titanate, isopropyltri dodecylbenzenesulphonyltitanate, isopropyldi-isostearoylacryltitanate, isopropyl isostearoyl diacryltitanate, isopropyltri(dioctylphosphate)titanate, isoprophltri(n-stearoyl)titanate, isopropyldi(butylmethylpyrophosphate)titanate, diisostearoyloxyacetatetitanate, isostearoylmethacryloxyacetatetitanate, di(dioctylphosphate)oxyacetatetitanate, isopropyltri acryltitanate, isopropyltri(N,N-dimethyl-ethylamino)titanate, isopropyltri anthranyltitanate, isopropyloctylbutylpyrophosphatetitanate, diacryloxyacetatetitanate, di(octyl butylpyrophosphate)oxyacetatetitanate, diisostearoylethylenetitanate, isostearoylmethacrylethylenetitanate, di(dioctylphosphate)ethylenetitanate, dimethacryloxyacetatetitanate, 4-aminobenzoil isostearoyloxyacetatetitanate, bis(dioctylpyrophosphate)oxyacetatetitanate, dianthranylethylenetitanate, bis(butyl, methylphrophosphate)ethylenetitanate, 4-aminobenzenesulphonyldodecylbenzenesulphonyl ethylenetitanate, dimethacrylethylenetitanate, 4-aminobenzoilisostearoylethylenetitanate, bis(dioctylpyrophosphate)ethylenetitanate, diacrylethylenetitanate, tetra(2,2-diacryloxymethyl-1-butyl)bis(di-tridecylphosphite)titanate, tetraoctylbis(di-tridecylphosphite)titanate, tetraisopropylbis(dioctylphosphite)titanate and others, for example.

For the formation of the magnetic layer, the composite having aforesaid composition is dissolved in the organic solvent to be coated on the supporting base as a coating solution.

The solvent for the magnetic coatings or an organic solvent to be used for the coating of the magnetic coatings includes ketone group such as acetone, methylethylketone, methylisobutylketone, cyclohexanon and others, alcohol group such as methanol, ethanol, propanol, butanol and others, ester group such as methyl acetate, ethyl acetate, butyl acetate, ethyl lactate, glycolacetate monoethylether and others, glycolether group such as glycoldimethylether, dioxane and others, tar group-(alomatic hydrocarbon) such as benzene, toluene, xylene and others and halogenated carbon hydride such as methylenechloride, ethylenechloride, carbontetrachloride, chloroform and dichlorobenzene and others.

The ferromagnetic powder of the present invention, binders, dispersing agents, lubricants, abrasives, antistatic agents, solvents and others are kneaded to prepare magnetic coatings.

When kneading, aforesaid ferromagnetic powder and aforesaid ingredients are projected into the kneader simultaneously or successively. One method, for example, is first to add the aforesaid ferromagnetic powder into a solution containing the dispersing agents and knead them for a certain period of time and then add remaining ingredients continuing the kneading and thus prepare the magnetic coatings.

Various types of kneaders are used for kneading and dispersing. For example, a two-roll mill, 3-roll mill, ball mill, pebble mill, sand grinder, Szegvari attriter, high-speed impeller disperser, high-speed stone mill, high-speed impact mill, disper kneader, high-speed mixer, homogenizer and ultrasonic disperser and others are available.

The technology relating to kneading and dispersing is described in Paint Flow and Pigment Dispersion written by T. O. Patton (issued by John Wiley & Sons Inc., in 1964). It is further described in the specifications of U.S. Pat. Nos. 2,581,414 and 2,855,156.

As a coating method for forming a magnetic layer by coating the aforesaid magnetic coatings on the support, an air doctor coat, blade coat, air knife coat, squeeze coat, impregnation coat, reverse roll coat, transfer roll coat, gravure coat, kiss coat, cast coat, spray coat and others are available and in addition to these, other methods are further available and these methods are described in detail in "Coating Engineering" (issued by Asakura bookstore in 1971).

The magnetic layer coated on the support in the aforesaid method, when desired is treated to orient ferromagnetic powder in the layer, and then dried. Then a surface smoothing treatment is given as desired and they are cut in the desired shape, to provide the magnetic recording media of the present invention.

In this case, it is desirable that the orientating magnetic field is about 500-3500 gauss AC or DC, the drying temperature is about 50°-100° C. and the drying time is about 10 seconds to 10 minutes.

The magnetic recording medium related to the present invention thus prepared was excellent in abrasion resistance. Further, compared with ferromagnetic powder in the form of acicular crystal and having a large acicular ratio, the magnetic recording medium thus prepared was excellent in preservability (change with the passage of time) because of the usage of ferromagnetic powder containing less edge portion whose activity-degreee is high (easily be rusted). Furthermore, the magnetic recording medium related to the present invention has remarkably been improved in the S/N ratio (ratio of signal to noise) compared with the conventional recording substance and the reproduction output thereof was also higher than that of the conventional one. Owing to the aforesaid excellent points, the magnetic recording medium related to the present invention showed an excellent performance especially in the high density recording.

DETAILED DESCRIPTION OF EXAMPLES

The present invention will be explained concretely referring to the comparative example and the examples as follows. The description "part" in the comparative example and the example means the "part by weight."
  comparative example
  iron magnetic powder (acicular ratio 10, grain size 0.8μ) 75 parts
  copolymer of partially hydrolyzed vinyl chloride and vinyl acetate ("VAGH" made by Union Carbide Corp.) 5 parts
  polyurethane resin ("Estane 5701" made by Goodrich Corp.) 9 parts titanium coupling agent ("Plen Act 38S" made by Ajinomoto Corp.) 0.5 parts
methylethylketone 70 parts
toluene 60 parts
cyclohexanone 5 parts The above mixture was fully mixed and dispersed in the ball mill and then 5 parts of Colonate L (polyisocianate solution made by Japan Polyurethane Corp.) were added thereto and thus magnetic coatings were obtained after uniform mixing.

The magnetic coatings thus obtained were coated on one side polyethyleneterephthalate film of 12μ thickness with a magnetic field of 2000 gauss being applied thereto so that the thickness after drying would be 5μ. Samples thus obtained were given a super-calender treatment and then were slitted in the width of 12.65 mm to be a video tape. This sample is designated as No. 0.

EXAMPLE 1 iron alloy magnetic powder (acicular ratio 3, grain size 0.4μ) 75 parts
VAGH 5 parts
Estan 5701 9 parts
Plen Act 38S 0.5 parts
methylethylketone 70 parts
toluene 60 parts
cyclohexanone 5 parts The above mixture was fully mixed and dispersed in the ball mill and then 5 parts of polyisocianate solution (made by Japan Polyurethane Corp.) were added thereto and thus magnetic coatings were obtained after uniform mixing.

The magnetic coatings thus obtained were coated on one side of polyethyleneterephthalate film of 12μ thickness with a magnetic field of 2000 gauss being applied thereto so that the thickness after drying would be 5μ.

Wide samples thus obtained were given a super-calender treatment and then were slitted in the width of 12.65 mm to be a video tape which is designated as No. 1.

EXAMPLES 2-5

Four groups of iron metal magnetic powder whose grain sizes are all 0.4μ and acicular ratios are 4, 2.5, 3.5 and 4.2 respectively were mixed with VAGH, Estane 5701, Plen Act 38S, methylethylketone, toluene and cyclohexanone in the same composition as above Example 1 respectively and then the mixtures thus obtained were fully mixed and dispersed in the ball mill and then 5 parts of polyisocianate solution made by Japan Polyurethane Corp. were added thereto and mixed uniformly thus magnetic coatings were prepared. The magnetic coatings thus obtained, after the same treatment as Example 1, were coated on polyethyleneterephthalate films 12μ thick which were finally slitted to be video tapes with 12.65 mm width which designated as No. 2, No. 3, No. 4 and No. 5 respectively.

Table 1 below shows acicular ratios and coercive forces Hc of aforesaid iron alloy magnetic powder.

TABLE 1

|  | magnetic material (acicular ratio) | coercive force (oersted) |
| --- | --- | --- |
| No-1 | metal magnetic powder(1:3) | 1420 |
| No-2 | (1:4) | 1510 |
| No-3 | (1:2.5) | 1400 |
| No-4 | (1:3.5) | 1460 |

TABLE 1-continued

|  | magnetic material (acicular ratio) | coercive force (oersted) |
| --- | --- | --- |
| No-5 | (1:4.2) | 1550 |
| comparative sample No. 0 | (1:10) | 1490 |

For the comparison of tape performance for the samples No. 0–No. 5 obtained from the aforesaid comparative example and Examples 1–5, RF output, S/N ratio (dB), chrom. S/N and the degree of gloss were measured and the results thereof are shown in Table 2 below wherein:

(a) RF Output

RF outputs for 4M Hz were measured by the use of the VTR deck for the measurement of RF (radio frequency) output, in which the output of comparative sample (No. 0) is 0 and measured values of other samples are shown in the relative values against the output of the comparative sample. (The values higher than that of the comparative sample are given the "+" mark and lower ones are given the "−" mark.)

(b) Chrominance S/N

Chrominance signal of 3.58 MHz was set at 0.714Vp-p to make a picture recording by putting the chrominance signal into a brightness signal and then the chrominance signal only was taken out by reproducing the recorded picture to obtain the ratio of the effective value (S) to the noise level which is produced when the chrominance signal is removed. In the table, however, the value of the comparative sample is set at "0" as a standard and the values of other samples are shown as a relative value against the value of the comparative sample.

(c) Degree of Gloss

The degree of gloss was measured by the glossmeter (GL-26D made by Murakami Color Research Lab), in which the degree of gloss resulting from the 60-degree reflection on the surface of the standard sample (black tile) is set as 100% and the degrees of gloss on the surfaces of samples to be measured (No. 0, No. 1, No. 2, No. 3, No. 4 and No. 5) are shown with relative values (%) and a higher relative value means a better degree of gloss.

TABLE 2

| sample No. | RF output$^a$ | chrominance S/N$^b$ | Degree of gloss (%)$^c$ |
| --- | --- | --- | --- |
| sample of this invention |  |  |  |
| No. 1 | +0.7 | 0.7 | 156 |
| No. 2 | +1.1 | 1.0 | 162 |
| No. 3 | +0.9 | 0.5 | 152 |
| No. 4 | +1.3 | 0.8 | 154 |
| No. 5 | +1.2 | 1.0 | 158 |
| comparative sample No. 0 | +0 | 0 | 148 |

From the foregoing, it is apparent that the magnetic recording tape of the present invention is excellent in RF output, chrominance signal and degree of gloss, compared with the conventional one (comparative sample).

On the other hand, when the acicular ratio of finely granulated magnetic powder is not more than 1.3, the shape anisotropy becomes smaller and when it is not smaller than 4.5, the magnetic powder become brittle and Hc scatters causing the magnetic transferring, which is not desirable as a magnetic recording medium.

Further, when the grain size is larger than 0.5µ, the S/N ratio of the magnetic recording medium caused by the size of magnetic grains becomes worse, which causes the high density recording to be difficult.

We claim:

1. A magnetic recording medium comprising a support and a magnetic layer on said support,
said magnetic layer being a unitary magnetic layer comprising ferromagnetic metallic powder, the average grain size of said ferromagnetic powder being not more than 0.5µ, the ratio of the major axis to the minor axis (acicular ratio) of said ferromagnetic powder being from 1.3 to 4.5, and the coercive force of said ferromagnetic powder being from 1350 Oe to 1600 Oe.

2. The magnetic recording medium according to claim 1, wherein said ferromagnetic metallic powder is selected from the group consisting of Fe-, Ni-, Co- and Cr-containing powder.

3. The magnetic recording medium according to claim 1, wherein said ferromagnetic powder is an iron-containing metallic powder.

4. The magnetic recording medium according to claim 3, wherein said iron-containing metallic powder is selected from the group consisting of Fe—Co—Ni, Fe—Ni—Zn, Fe—Al, Fe—Al—P, Fe—Co—Ni—Cr, Fe—Co—Ni—P, Fe—Ni, Fe—Ni—Mn, Fe—Ni—Cr—P, Fe—Ni—Co—Zn.

5. The magnetic recording medium according to claim 3, wherein said iron-containing metallic powder contains iron in an amount of not less than 60% by weight.

6. The magnetic recording medium according to claim 2, wherein said ferromagnetic powder is an iron-containing metallic powder containing iron in an amount of not less than 80% by weight.

7. The magnetic recording medium according to claim 1, wherein said ferromagnetic magnetic layer also contains a binder.

8. The magnetic recording medium according to claim 7, wherein said binder is contained in said magnetic layer at a proportion of 5 to 400 parts by weight relative to 100 parts by weight of of said ferromagnetic powder.

9. The magnetic recording medium according to claim 7, wherein said binder is contained in said magnetic layer at an amount of 10 to 100 parts by weight per 100 parts by weight of said ferromagnetic powder.

10. The magnetic recording medium according to claim 7, wherein said binder is selected from the group consisting of thermoplastic resins, thermosetting resins, radiation curable resins, reactive resins, electron-irradiation-setting resins and mixture thereof.

11. The magnetic recording medium according to claim 1, wherein said support is selected from the group consisting of polymeric resins, non-magnetic metals and ceramics.

12. The magnetic recording medium according to claim 11, wherein said support is a polymeric resin selected from the group consisting of polyesters, polyolefins, cellulose derivatives, polycarbonate, polyvinylchloride, polyimide and nylon.

13. The magnetic recording medium according to claim 11, wherein said support is a non-magnetic metal support of aluminum, zinc or an alloy thereof.

14. The magnetic recording medium according to claim 11, wherein said support is in the form of film or sheet, card, disc or cylindrical drum.

15. The magnetic recording medium according to claim 1, wherein said average grain size of said ferromagnetic powder is between 0.05 micron to 0.5 micron.

16. The magnetic recording medium according to claim 15, wherein said average grain size of said ferromagnetic powder is between 0.1 micron to 0.3 micron.

17. The magnetic recording medium according to claim 6, wherein said ferromagnetic layer also contains a binder in an amount of between 10 and 100 parts by weight per 100 parts by weight of said ferromagnetic powder and wherein said average grain size of said ferromagnetic powder is between 0.05 micron and 0.5 micron.

18. The magnetic recording medium according to claim 17, wherein said binder is selected from the group consisting of thermoplastic resins, thermosetting resins, radiation curable resins, reactive resins, electron-irradiation-setting resins and mixtures thereof and wherein said support is a polymeric resin selected from the group consisting of polyesters, polyolefins, cellulose derivatives, polycarbonate, polyvinylchloride, polyimide and nylon.

19. The magnetic recording medium according to claim 18, wherein said average grain size of said ferromagnetic powder is between 0.1 micron to 0.3 micron.

20. The magnetic recording medium according to claim 18, wherein said support is a non-magnetic metal support of aluminum, zinc or an alloy thereof and wherein said average grain size of said ferromagnetic powder is between 0.1 micron to 0.3 micron.

* * * * *